Oct. 24, 1950     W. HUCAL     2,527,480
NUT TAPPING MACHINE
Filed Feb. 1, 1946     2 Sheets—Sheet 1
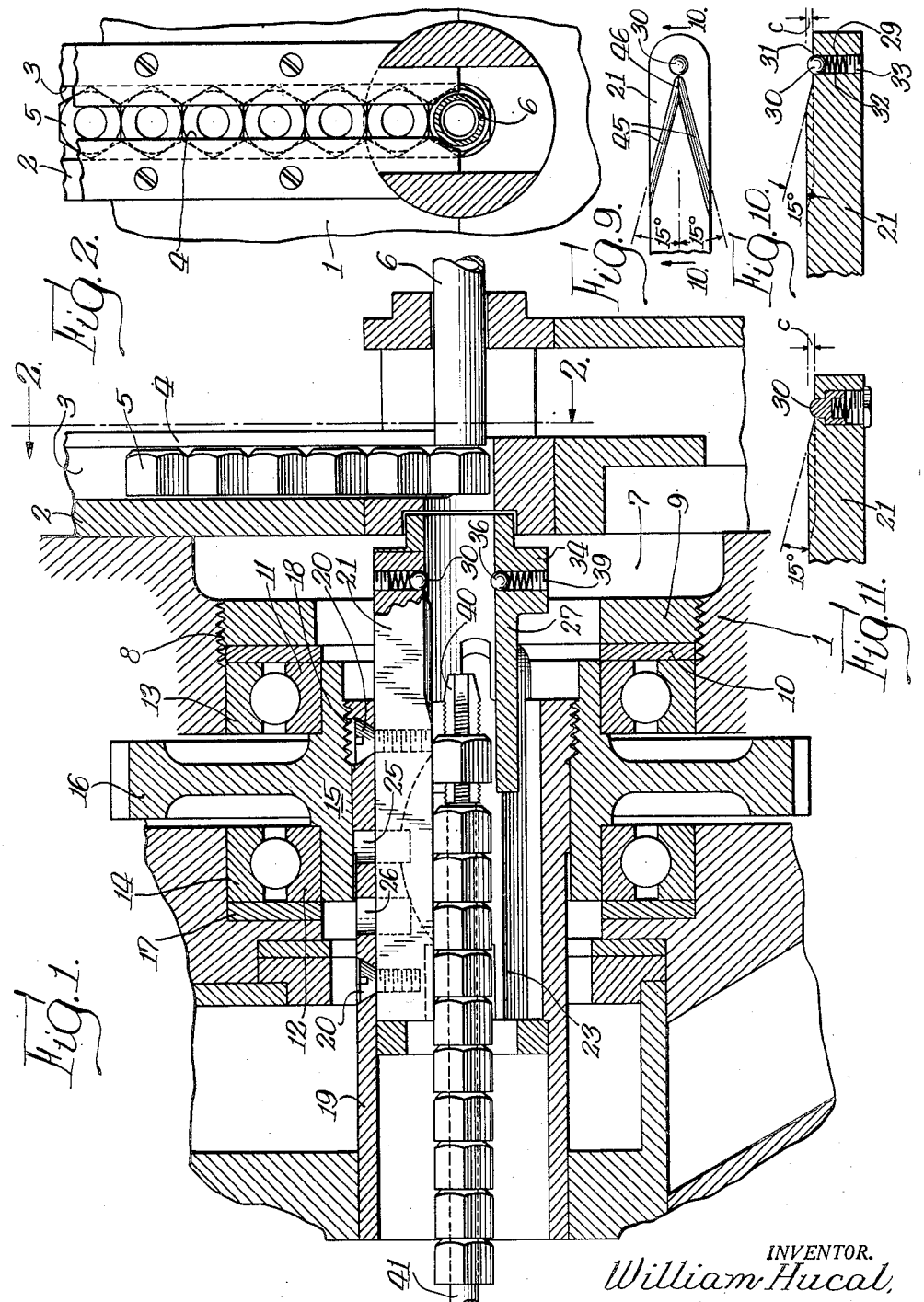
INVENTOR.
William Hucal,
BY
Chritton, Schroeder, Merriam & Hofgren
Attys.

Oct. 24, 1950  W. HUCAL  2,527,480
NUT TAPPING MACHINE
Filed Feb. 1, 1946  2 Sheets-Sheet 2
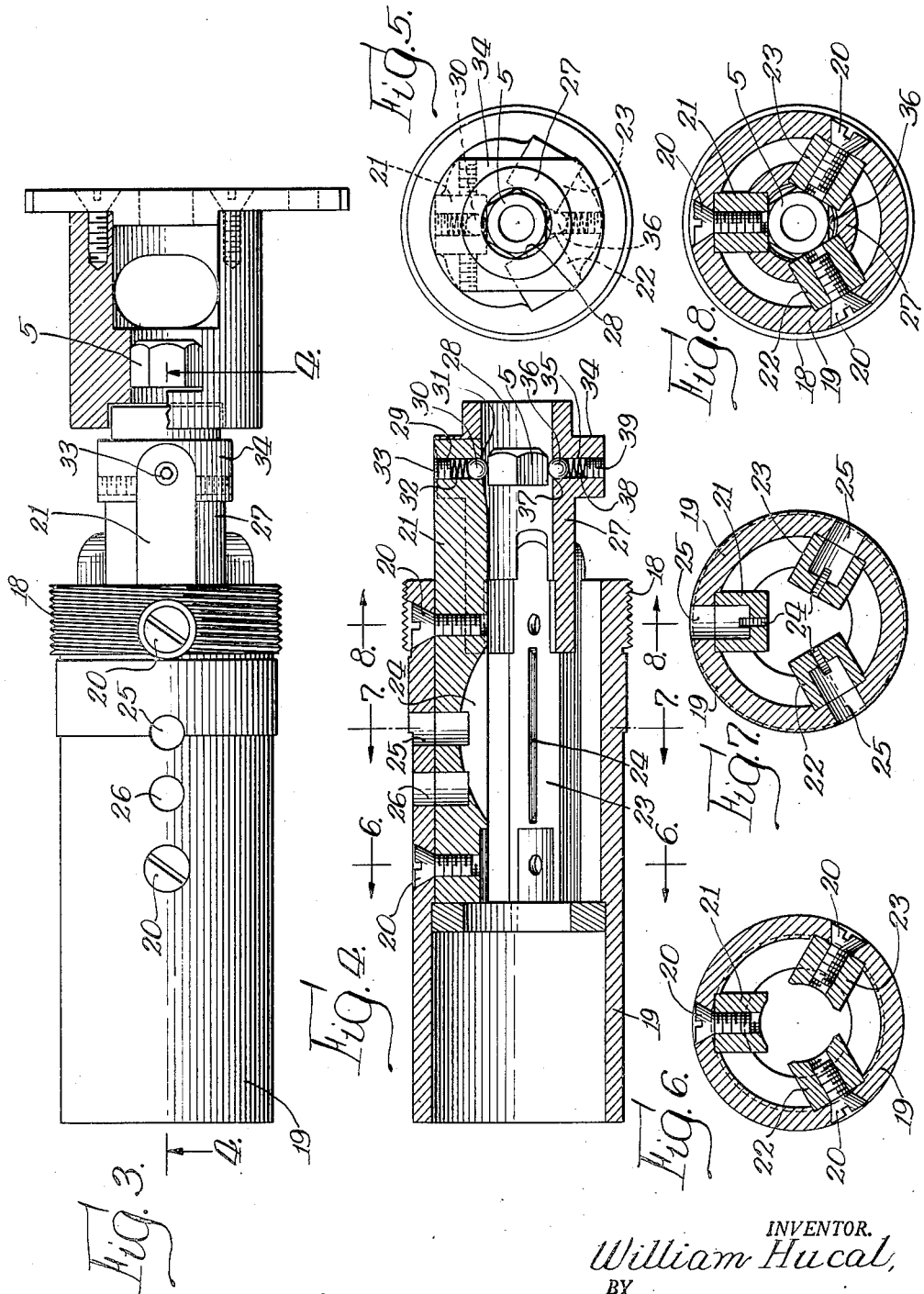
INVENTOR.
William Hucal,
BY
Chritton, Schroeder, Merriam & Hofgren
Attys.

Patented Oct. 24, 1950

2,527,480

UNITED STATES PATENT OFFICE 2,527,480

NUT TAPPING MACHINE

William Hucal, Chicago, Ill.

Application February 1, 1946, Serial No. 644,707

6 Claims. (Cl. 10—139)

This invention relates to a nut tapping machine and more particularly to such machine having improved means for placing the nut in the proper position as it enters the holder within which it is to be tapped.

In nut tapping machines it is very important that the machine be kept running smoothly and continuously, without stoppage being required because of improperly positioned nuts. Among the objects of the present invention are: to provide a novel and improved nut tapping machine; to provide a nut tapping machine embodying novel means for placing the nut in proper position as it advances to be tapped; to provide novel means for giving an improperly positioned nut a slight twisting movement to turn it into the proper position for advancing it into the holder wherein it is to be tapped; to provide means that will automatically throw the nut in a rotational direction with relation to the holder into the proper position it should occupy when being advanced into the rotary holder; to provide a pair of opposite spring pressed elements which, when the nut approaches the entrance to the holder in an improper position, the element will cause the nut to be automatically rotated into its proper position with relation to the holder; to provide a pair of opposite spring pressed balls for accomplishing the purposes stated, said balls automatically rotating to carry the nut into proper position when an improperly positioned nut is pressed against the balls; to provide a pair of oppositely positioned spring pressed balls for aligning the nut with angular faces within the holder, which faces drive the nut in a rotational direction for tapping; and such further objects, advantages and capabilities, inherently possessed by my invention, as will later more fully appear.

My invention further resides in the combination, construction and arrangement of parts illustrated in the accompanying drawings, and while I have shown therein for illustrative purposes only, preferred embodiments, I wish it understood that the same are susceptible of modification and change without departing from the spirit of my invention.

In the drawings:

Fig. 1 is a fragmentary vertical central section through a nut tapping machine embodying my invention.

Fig. 2 is a fragmentary section on the line 2—2 of Fig. 1.

Fig. 3 is a top plan view, partly in section, of the holder, the parts for properly positioning the nut, the means for receiving the nut from a hopper and a nut in position to be guided into the holder.

Fig. 4 is a longitudinal central section on the line 4—4 of Fig. 3.

Fig. 5 is an end elevation looking toward the right hand end of Fig. 4.

Fig. 6 is a vertical transverse section on the line 6—6 of Fig. 4.

Fig. 7 is a vertical transverse section on the line 7—7 of Fig. 4.

Fig. 8 is a vertical transverse section on the line 8—8 of Fig. 4.

Fig. 9 is a fragmentary inner face view of the entry end of the upper one of the angularly positioned bars for receiving and rotating the nut.

Fig. 10 is a fragmentary longitudinal section on the line 10—10 of Fig. 9; and,

Fig. 11 is a view similar to Fig. 10 of a modified form of angle bar.

In the form shown for illustrative purposes in the drawing, my improved nut tapping machine comprises a main body portion 1 having attached to its forward end a hopper neck 2 provided with a nut receiving passageway 3 and a front central slot 4 for permitting observation of passage of the blank nuts 5 passing downwardly from the hopper. The bottom nut in the hopper neck, as seen in Figs. 1 and 2, is in position to be aligned with a reciprocating plunger 6 operated by any suitable mechanism as is conventional in this type of machine.

The main body portion 1 comprises the circular cavity 7, and opening into this cavity is a smaller circular opening, the walls of which are formed with interior screw threads 8 threadably receiving the ring 9. Ring 9 bears against the washer 10 which in turn has contact with one section of a ball bearing mounting comprising the two inner annular raceways 11 and 12 and the two outer annular raceways 13 and 14. Inner raceways 11 and 12 are fixed to the hub 15 of the gear 16, which gear is rotatably driven by any suitable conventional driving means. Contacting the raceways 12 and 14 is another vertical washer 17 which in turn bears against an adjacent face of the body portion 1. These parts will be held together by suitably tightening the ring 9. The hub 15 of the gear is provided with a central bore, the wall of which is formed with screw threads 18 for threadably receiving complemental threads in the outer end portion of the casing 19 of the holder shown in Fig. 3. Rotation of gear 16 will cause rotation of the holder 19, which in turn will cause rotation of the nut blank as it moves longitudinally into the interior of the holder to be tapped by the tap in a manner more fully hereinafter described.

Fixed to the holder sleeve 19 by flat headed screws or the like 20 at circumferentially spaced positions therein are three sets of angularly positioned bars 21, 22 and 23 as seen in Figs. 6–8. These bars have flat inner faces for the greater part of their length (see Figs. 7 and 8), which flat faces are positioned to substantially align with three of the alternate faces of a hexagonal nut blank so as to drive said blanks in a rotational direction when forced therebetween by plunger 6, it being understood, as stated above, that the holder is rotated by gear 16. These bars 21, 22 and 23 are formed with longitudinally extending slots 24 circularly curved in radial planes and which slots have communication with radial openings 25 and 26, which in turn have connection with a tapping liquid such as oil, soap, water or the like to lubricate the nut blank and prevent overheating of the same while being tapped. Fig. 8 shows one of the nut blanks in position between the flat faces of bars 21, 22 and 23 for rotation with the holder while being tapped. Fixed to the interior of the right hand end of the holder as viewed in Fig. 4 is a sleeve 27 having a substantially cylindrical throat or opening 28 extending therethrough. Bar members 21, 22 and 23 at their right hand ends as viewed in Fig. 4 are fixed in any suitable manner to the sleeve 27 so that as the holder and bar members rotate, sleeve 27 will rotate therewith, said throat or opening 28 axially communicating with the space between the bar members 21, 22 and 23.

As seen in Figs. 3 and 4 the bar member 21 is extended forwardly and inserted into a slot in the sleeve 27 and welded or otherwise fixed thereto as desired. Bar 21 is longer than bars 22 and 23 and near its forward end (right hand end as viewed in Figs. 3 and 4) is provided with a radial hole 29 receiving the ball 30, which ball is prevented from being pushed entirely inwardly through said opening by reason of a slightly restricted portion 31. A coil spring 32 is positioned back of ball 30 to normally urged the same inwardly, this spring being held in position in opening 29 by short screw stud 33. Sleeve 27, at a point diametrically opposite hole 29, and extending through sleeve 27 and its neck 34, is formed with a similar hole 35 in which is mounted a ball 36 which is prevented from being pushed entirely inside of throat 28 by a restricted portion 37 and normally urged inwardly by a spring 38 held in place by a short screw stud 39. The restricted portions 31 and 37 of openings 29 and 35 permit the balls to extend a limited distance into throat 28 without passing entirely thereinto and the springs 32 and 38 permit the balls to be pushed rearwardly when contacted by adjacent flat faces of an improperly placed nut.

As will be understood, the nut blanks 5 will be intermittently forced inwardly of the machine by the plunger 6 which will carry each nut blank into the throat 28 between the balls 30 and 36 and if such nut blank is not properly placed with relation to the position it will occupy when being tapped inside of the holder the balls will, under pressure from the nut blank, be automatically rotated a sufficient amount to properly place the nut blank with relation to the inner flat faces of the bars 21, 22 and 23. In other words, if the balls contact an improperly placed nut blank away from the middle of the adjacent flat faces thereof, a pressure will be exerted by the nut blank against the balls which will automatically force the nut blank in a rotational direction until they are held between the opposite balls with the centers of these flat faces in alignment with the vertical axis of the balls. For example, if a nut blank be pushed by the plunger into the throat of the holder with two diametrically opposite apices respectively or other off-center portions, striking the balls, continued push upon the nut blank will cause the nut blank under rolling pressure from the balls to be rotated an amount until the nut blank freely passes between the diametrically opposite balls, at which time it will be in proper position to pass into the space between the bar members 21, 22 and 23 for rotation with the holder.

Longitudinally reciprocable in the holder 19 is a nonrotatable trap 40 having a tap stem 41, reciprocatory movement being imparted to these members in a conventional manner. In Fig. 1 is shown a nut blank on the tap and forced partway therealong. As soon as the nut is tapped it is forced rearwardly by the threads of the tap along the shank 41, these tapped nuts being successively followed by other tapped nuts until the shank 41 is filled, after which the tapped nuts will be consecutively discharged into a suitable receptacle in any suitable conventional manner. The tap 40 and tap shank 41 are nonrotatable, and the nut blank during the tapping operation is rotated onto the tap by the rotation of the holder. After the nut has been forced by the plunger 6 a suitable distance onto the tap the plunger will be returned to the position shown in Fig. 1 at which time a fresh blank nut drops in front of the plunger to be pushed into the holder under proper timing of the machine. Suitable conventional mechanism is provided for advancing the tap a suitable distance forwardly to receive a nut blank and as soon as the nut blank has been forced a suitable distance onto the tap the rotation of the holder will cause the stationary tap to have the nut blank being tapped forced therealong by the action of the threads being cut by the tap. As the tap is being pushed into the nut blank the tap is moved forwardly at a speed corresponding to the pitch of the threads being cut, in a conventional manner.

As seen in Figs. 9, 10 and 11, the bar 21 is slightly reduced in radial thickness at its forward end, and is formed with V-shaped sloping shoulders 45 making an angle of 15 degrees with the longitudinal center line of the bar on each side. These shoulders terminate at their forward end in an apical line 46 which is inclined from the main portion of the inner flat face to, or approximately to, the adjacent ball 30. This construction facilitates the passage of the nut blank to the interior of the holder. The inclined beveled side edges 45 extend rearwardly respectively on opposite sides of the center line so that a portion of a misplaced nut will ride rotationally in one direction or the other depending upon which of these inclined shoulders it first strikes, it having been guided to one or the other of these beveled shoulders by first riding over the ball 30. This gives a much more efficient and positive positioning of the nut blanks so that they will be sure to enter the central opening between the circumferentially spaced flat faces in a correct position. In Fig. 11 the construction is the same as that shown in Figs. 9 and 10, except that instead of a rotatable ball there is used a spring pressed block having an exposed curved end over which the nut blanks slide.

I claim:

1. In a nut tapping machine, a rotatable tubular cylindrical member having fixed to its interior face three circumferentially spaced elongated bars each having an inner flat face, a tubular neck fixed to said cylindrical member at one end and having a nut-blank-receiving cylindrical throat, said neck having a pair of diametrically opposite radial openings, a ball in each opening mounted to protrude only partway into the throat, a spring back of each ball to yieldably urge it into said partway position, one of said balls being in longitudinal alignment with the longitudinal center line of one of said flat faces, the flat face which is in said alignment having its side edge portions at the end toward the aligned ball laterally beveled and tapered to an inclined apical line longitudinally beveled from the main portion of said inner flat face to the adjacent ball, whereby when a misplaced nut-blank contacts said balls under longitudinal pressure the balls will be partially rotated and partially rotate the nut-blank and bring it into proper placement to pass into the space between said flat faces.

2. In combination in a nut tapping machine, a rotary hollow holder having fixed on its interior a plurality of circumferentially spaced bars having angularly positioned inner flat faces adapted to slidably receive some of the flattened edges of a nut passing axially therebetween and rotating with the holder, a tap in said holder, a tubular neck fixed in said holder and extending outwardly therefrom at one end, one of said bars extending longitudinally into said neck, the outer end of said extending bar having a radial opening, a ball in said opening protruding partway into the opening in the tubular neck, resilient means to urge the ball into said partway position, the inner face of said extending bar having a V-shaped inclined shoulder the apex of which is positioned just inwardly of said ball, and a second resiliently urged ball in said tubular neck opposite the first-mentioned ball.

3. In combination in a nut tapping machine, a rotary hollow holder having fixed on its interior a plurality of circumferentially spaced bars having angularly positioned inner flat faces adapted to slidably receive some of the flattened edges of a nut passing axially therebetween and rotating with the holder, a tap in said holder, a tubular sleeve fixed in said holder and extending outwardly therefrom at one end, the open interior of said tubular sleeve forming a throat having an open forward end for initially receiving a nut-blank, one of said bars having a radial opening formed with a restricted inner end, a ball mounted for universal rotation in said restricted end and extending partway into said throat, the inner face of said one of said bars having a pair of bevelled shoulders converging to an apex positioned just inwardly of said ball, said ball being positioned between the open forward end of the sleeve and said apex for guiding a nut-blank along one of said shoulders and into proper position between said plurality of bars.

4. In combination in a nut tapping machine, a rotary hollow holder having fixed on its interior a plurality of circumferentially spaced bars having angularly positioned inner flat faces adapted to slidably receive some of the flattened edges of a nut passing axially therebetween and rotating with the holder, a tap in said holder, a tubular neck fixed in said holder and extending outwardly therefrom at one end, the open interior of said tubular neck forming a throat, said neck having a radial opening, a placer member in said radial opening, means in the walls of the radial opening to cause the placer member to protrude only partway into the throat, resilient means in the radial opening to urge the placer member partially into the throat, the axis of said placer member falling in the longitudinal center line of one of said angular flat faces, said last mentioned face having a pair of beveled shoulders converging from the side edges of the face to closely adjacent said placer member.

5. The combination of claim 4, having a second similar placer member mounted in the tubular neck at a point circumferentially removed from the first mentioned placer member, that portion of said last mentioned face toward the nut receiving end from said bevelled shoulders being in a plane farther away from the axis of the neck than that portion at the opposite end of said shoulders.

6. In combination in a nut tapping machine, a rotary nut holder having a longitudinal opening and provided with a plurality of circumferentially spaced elongated bars having flat faces to slidably receive some of the flat edges of nut blanks and rotate said blanks as the holder rotates, a tap in said holder, a hollow sleeve extending from one end of said holder, one of said bars having a radial opening, a placer member in said radial opening, resilient means for urging said placer member to yieldably protrude partway into the hollow of said hollow sleeve, the inner face of said one of said bars having two parallel surfaces in different planes, said surfaces joining each other in a pair of inclined beveled shoulders converging to an apex just inwardly of the protruding portion of the placer member, a plane passing through the axis of the placer member, said apex and the axis of rotation of the rotary holder also approximately passing through the longitudinal center line of said one of said bars.

WILLIAM HUCAL.

REFERENCES CITED

The following references are of record in the file of this patent:

UNITED STATES PATENTS

| Number | Name | Date |
| --- | --- | --- |
| 1,147,267 | Regney | July 20, 1915 |
| 1,543,175 | McCarthy | June 23, 1925 |
| 1,607,421 | Work | Nov. 16, 1926 |
| 1,842,760 | Matthews | Jan. 26, 1932 |
| 1,944,653 | Clouse | Jan. 23, 1934 |
| 2,220,354 | Sheetz | Nov. 5, 1940 |

FOREIGN PATENTS

| Number | Country | Date |
| --- | --- | --- |
| 434,063 | Great Britain | Aug. 26, 1935 |